United States Patent
Lee et al.

(10) Patent No.: US 10,516,302 B2
(45) Date of Patent: Dec. 24, 2019

(54) WIRELESS POWER TRANSMITTER UTILIZING PHASE AND AMPLITUDE CONTROL ALGORITHM AND WIRELESS POWER RECEIVER

(71) Applicants: SAMSUNG ELECTRONICS CO., LTD., Suwon-si (KR); KOREA ADVANCED INSTITUTE OF SCIENCE AND TECHNOLOGY, Daejeon (KR)

(72) Inventors: Jaesup Lee, Yongin-si (KR); Injune Hwang, Daejeon (KR); Seungtae Khang, Daejeon (KR); Jongwon Yu, Daejeon (KR)

(73) Assignees: SAMSUNG ELECTRONICS CO., LTD., Suwon-si (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 290 days.

(21) Appl. No.: 15/491,158

(22) Filed: Apr. 19, 2017

(65) Prior Publication Data
US 2017/0302109 A1    Oct. 19, 2017

(30) Foreign Application Priority Data
Apr. 19, 2016 (KR) .................. 10-2016-0047560

(51) Int. Cl.
*H02J 50/20* (2016.01)
*H02J 7/02* (2016.01)
*H02J 50/23* (2016.01)
*H02J 7/00* (2006.01)
*H02J 50/27* (2016.01)

(52) U.S. Cl.
CPC .............. *H02J 50/20* (2016.02); *H02J 7/025* (2013.01); *H02J 50/23* (2016.02); *H02J 50/27* (2016.02); *H02J 2007/0096* (2013.01)

(58) Field of Classification Search
CPC ................................................. H02J 50/20–27
See application file for complete search history.

(56) References Cited

U.S. PATENT DOCUMENTS 7,068,991 B2   6/2006  Parise
8,072,380 B2   12/2011 Crouch
(Continued)

*Primary Examiner* — Rexford N Barnie
*Assistant Examiner* — David A Shiao
(74) *Attorney, Agent, or Firm* — Sughrue Mion, PLLC

(57) ABSTRACT

A wireless power transmitter includes a signal generator for generating power signals, a modulator for modulating a phase of a power signal to be time reversed based on beacon signals received from the wireless power transmitter and modulating an amplitude of a power signal to be amplified, a controller for providing a phase and amplitude control algorithm to be performed by the modulator, and an antenna unit for transmitting the power signals and receiving the beacon signals. The wireless power transmitter controls the amplification of amplitudes by using the phase and amplitude control algorithm, thereby improving wireless power transmission efficiency. In addition, the wireless power transmitter includes a multiple polarization antenna to enable high-efficiency wireless power transmission, regardless of a direction of the power signals and a direction of polarization.

19 Claims, 15 Drawing Sheets

(56) References Cited

U.S. PATENT DOCUMENTS

| | | | |
|---|---|---|---|
| 8,410,953 B2 | 4/2013 | Zeine | |
| 2011/0156493 A1 | 6/2011 | Bennett | |
| 2012/0193999 A1* | 8/2012 | Zeine | H02J 7/025 |
| | | | 307/104 |
| 2012/0326660 A1* | 12/2012 | Lu | H02J 17/00 |
| | | | 320/108 |
| 2014/0217967 A1 | 8/2014 | Zeine et al. | |
| 2015/0022009 A1 | 1/2015 | Leabman et al. | |
| 2016/0197522 A1* | 7/2016 | Zeine | H02J 5/005 |
| | | | 307/104 |
| 2016/0299210 A1* | 10/2016 | Zeine | G01S 5/0294 |
| 2017/0005531 A1* | 1/2017 | Zeine | H02J 50/80 |
| 2017/0141620 A1* | 5/2017 | Zeine | H02J 50/20 |
| 2017/0179763 A9* | 6/2017 | Leabman | H02J 50/40 |
| 2017/0256994 A1* | 9/2017 | Joyce | H02J 50/90 |

* cited by examiner

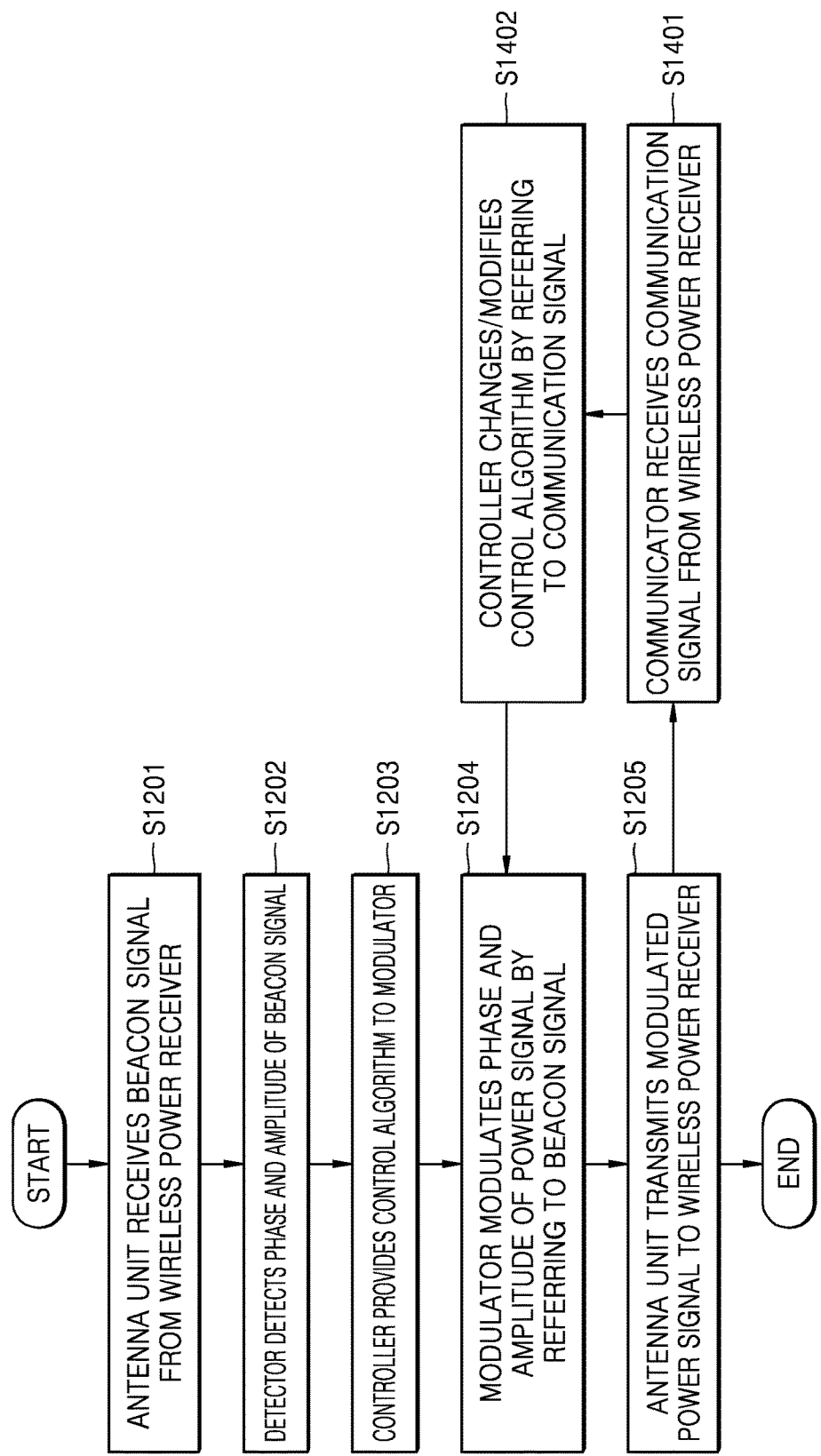

WIRELESS POWER TRANSMITTER UTILIZING PHASE AND AMPLITUDE CONTROL ALGORITHM AND WIRELESS POWER RECEIVER

CROSS-REFERENCE TO RELATED APPLICATION

This application claims priority from Korean Patent Application No. 10-2016-0047560, filed on Apr. 19, 2016 in the Korean Intellectual Property Office, the disclosure of which is incorporated herein by reference in its entirety.

BACKGROUND

1. Field

Exemplary embodiments relate to a wireless power transmitter utilizing a phase and amplitude control algorithm, and a wireless power receiver.

2. Description of the Related Art

Wireless power transmission technology capable of delivering electrical energy wirelessly to a receiver has been developed according to a method of transferring electrical energy by using electromagnetic waves, such as radio waves or lasers, from a transformer or an electric motor by using the electromagnetic induction principle. Such an energy transfer method by a wireless scheme to date uses magnetic induction technology, magnetic resonance technology, long-distance transmission technology using a microwave frequency in short wavelengths, and the like.

In the case of wireless power transmission technology using a microwave frequency in short wavelengths, a method of transmitting beamforming has been mainly used when electronic signals from a receiver are received in three dimensions by a transceiver to thereby specify a location of the receiver. However, if the location of the receiver is changed or there is an obstacle along a straight line between the receiver and the transceiver, power transmission efficiency may be reduced. Thus, studies continue to overcome such reductions in power transmission efficiency.

SUMMARY

One or more exemplary embodiments provide a wireless power transmitter that improves power transmission efficiency by using a phase and amplitude control algorithm and a wireless power receiver.

Additional aspects will be set forth in part in the description which follows and, in part, will be apparent from the description, or may be learned by practice of the presented exemplary embodiments.

According to an aspect of an exemplary embodiment, a wireless power transmitter includes: a signal generator for generating power signals; a detector for detecting a phase and an amplitude of beacon signals received from a wireless power receiver; a modulator for modulating a phase and an amplitude of the power signals generated by the signal generator to be time reversed based on the received beacon signals and to be amplified, respectively; a controller for providing a phase and amplitude control algorithm to be executed by the modulator; and at least one antenna for receiving the beacon signals and transmitting the power signals modulated by the modulator to the wireless power receiver.

The modulator may include a plurality of phase-amplitude modulators, and the at least one antenna may include a plurality of antennas, wherein the plurality of antennas and the plurality of phase-amplitude modulators may have a one-to one correspondence or a many-to-one correspondence therebetween.

The detector may include a plurality of phase-amplitude detectors and the at least one antenna may include a plurality of antennas, wherein the plurality of antennas and the plurality of phase-amplitude detectors may have a one-to one correspondence or a many-to-one correspondence therebetween.

The phase and amplitude control algorithm may operate to amplify the power signals by combining the power signals with amplitudes of the beacon signals that are multiplied by predetermined factors.

The phase and amplitude control algorithm may operate to variably amplify power signals corresponding to a beacon signal having an amplitude that is not beyond a threshold value among the beacon signals.

The phase and amplitude control algorithm may operate to amplify the power signal by combining the power signals with amplitudes of the beacon signals and amplitudes of predetermined values.

The phase and amplitude control algorithm may operate to variably amplify the power signals corresponding to a beacon signal having an amplitude that is not beyond a threshold value among the beacon signals.

The at least one antenna may receive communication signals from the wireless power receiver and provide the communication signals to the controller, and the controller may analyze the communication signals in order to adjust the modulation of the phase and the amplitude of the power signal.

The wireless power transmitter may further include a communicator for receiving communication signals from the wireless power receiver and transmitting the communication signals to the controller, wherein the controller may analyze the communication signals in order to adjust the modulation of the phase and the amplitude of the power signal.

The controller may be configured to modify the phase and amplitude control algorithm based on the communication signals.

The detector may detect rates of change over time in the phase and the amplitude of the beacon signals, and the modulator may be configured to perform a time reversal process on the phase of the power signals and to amplify the amplitude of the power signals, the power signals being generated by the signal generator, based on the modified beacon signals when the rates of change exceed a predetermined value.

The at least one antenna may include at least one multiple polarization antenna.

The wireless power receiver may include at least one multiple polarization antenna.

According to an aspect of another exemplary embodiment, a wireless power receiver includes: at least one multiple polarization antenna that receives wireless power signals from the wireless power transmitter described above; a rectifier for rectifying the wireless power signals into direct current signals; and a beacon signal generator for transmitting beacon signals to the wireless power transmitter.

The wireless power receiver may further include a communicator for providing communication signals to the wireless power transmitter.

The wireless power receiver may include at least one of a mobile phone, a portable headset, a laptop personal computer (PC), a tablet PC, a portable MP3 player, a portable video player, a smart watch, and a wireless sensor.

The wireless power receiver may have an external shape having side surfaces configured to connect a first pair of surfaces that face each other and a second pair of surfaces that face each other.

The at least one multiple polarization antenna may include two single polarization antennas, and the two single polarization antennas may have a predetermined angle therebetween on the side surfaces.

According to an aspect of another exemplary embodiment, a wireless power transmitter system includes: a wireless power transmitter; and a wireless power receiver, wherein the wireless power receiver includes a beacon signal generator for generating beacon signals and an antenna for transmitting beacon signals upon receiving power signals from the wireless power transmitter, and the wireless power transmitter includes a detector for detecting a phase and an amplitude of the beacon signals, a modulator for modulating a phase of the power signals based on a time reversal phase of the beacon signals and an amplitude of the power signals to be amplified according to a phase and amplitude control algorithm, and a controller for calculating the time reversal phase of the beacon signals and providing the phase and amplitude control algorithm to the modulator.

BRIEF DESCRIPTION OF THE DRAWINGS

The above and/or other aspects will become apparent and more readily appreciated from the following description of exemplary embodiments, taken in conjunction with the accompanying drawings in which:

FIG. 15 is a flowchart of a method of wireless power transmission, according to another exemplary embodiment.

DETAILED DESCRIPTION

Figure 1:
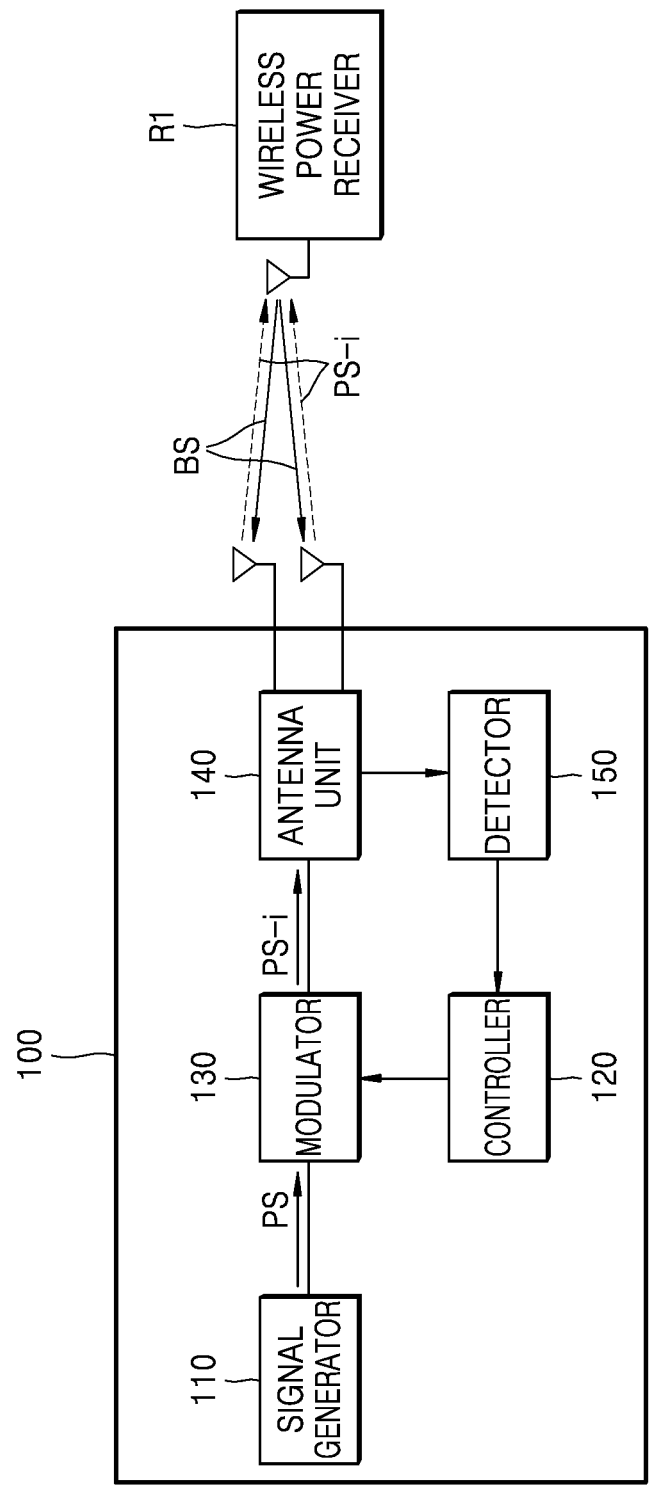
FIG. 1 is a block diagram of a wireless power transmitter, according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, a wireless power transmitter using a phase-amplitude control algorithm and a wireless power receiver will be described in detail with reference to the attached drawings. In the drawings, the widths and the thicknesses of layers or regions may be exaggerated for clarity of the specification and convenience of explanation. Like reference numerals throughout the description denote like elements.

The terms used in the present specification have been selected from currently widely used general terms in consideration of the functions in the exemplary embodiments. However, the terms may vary according to the intention of one of ordinary skill in the art, case precedents, and the advent of new technologies. Also, for special cases, meanings of the terms selected by the applicant are described below in the description section. Accordingly, the terms used in the present specification are defined based on their meanings in relation to the contents discussed throughout the specification, not by their simple meanings.

Throughout the specification, when a portion "includes" an element, another element may be further included, rather than excluding the existence of the other element, unless otherwise described.

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

FIG. 1 is a block diagram of a wireless power transmitter 100, according to an exemplary embodiment. Referring to FIG. 1, the wireless power transmitter 100 includes a signal generator 110, a controller 120, a modulator 130, and an antenna unit 140.

The wireless power transmitter 100 may modulate a power signal (PS) based on a beacon signal (BS) received from a wireless power receiver (R1), to thereby transmit a PS with high efficiency. For example, the wireless power transmitter 100 may time reverse a phase of the BS, and transmit a modulated PS (PS-i) having an amplified amplitude to the wireless power receiver R1. The indicator i used herein is an index indicating the number of antenna(s) included in the antenna unit 140. The indicator is a randomly given symbol to specify an antenna, and may be represented by a number, a letter, or a shape.

The signal generator 110 may generate a PS. The PS may be, for example, an alternating current (AC) signal having a constant amplitude and a constant phase. The signal generator 110 may transmit a PS to the modulator 130. The PS may include an electromagnetic wave within various frequency spectra. For example, the PS may include an electromagnetic wave in a radio frequency range or a microwave frequency range. The PS having a domain of such a radio frequency or a microwave frequency may reduce interference to other communication devices. For example, the PS may have a frequency having a domain that corresponds to an industrial scientific medical (ISM) band.

The controller 120 may control all operations of the wireless power transmitter 100. The controller 120 may provide a phase and amplitude control algorithm, which is to be executed by the modulator 130, to the modulator 130. The controller 120 may compute phase modulation and amplitude modulation of the PS, to thereby increase wireless power transmission efficiency. For example, the controller 120 may compute phase modulation and amplitude modulation of the PS, to thereby provide a weight value that results from the computation to the modulator 130, based on a BS transferred from the antenna unit 140. The weight value is a calculated modulation value to be referred to by the modulator 130 in terms of phase and amplitude modulations.

The controller 120 may include a microprocessor and/or any of various analog-digital logics.

The modulator 130 may modulate both the phase and amplitude of the PS, according to the control of the controller 120.

The modulator 130 may modulate the PS transferred from the signal generator 110, according to the control of the controller 120, so that the phase of the PS corresponds to a time-reversal phase of the BS. For example, a time-reversal phase may be obtained by complex conjugation of a wave. For example, a time-reversal phase may be obtained by reversing a phase of a wave by as much as π/2.

The modulator 130 may amplify an amplitude of the PS, according to the control of the controller 120. In terms of transmission of the PS-i having a time-reversal phase, an extent of the amplitude of the BS is related to the efficiency of power transmission. The wireless power transmitter 100 has a limited amount of total transmissible power, and thus, the phase and amplitude control algorithm may be required for efficient power transmission. For example, the phase and amplitude control algorithm may control an amplitude factor of the PS, based on an extent of an amplitude of the BS. For example, when an amplitude of the BS is large, the controller 120 may assign a weight value to the modulator 130 based on the phase and amplitude control algorithm, to thereby transmit a PS-i having a larger amplitude than the amplitude of the BS. The modulator 130 modulates the PS once the controller 120 assigns the phase and amplitude control algorithm to the modulator 130. Exemplary embodiments of the phase and amplitude control algorithm are described in detail below with reference to FIGS. 5, 6, 7, 8, and 9.

The antenna unit 140 may transmit the modulated PS-i to the wireless power receiver R1. The antenna unit 140 may transmit a plurality of PS-i(s), each of which corresponds to the index i, to the wireless power receiver R1.

The antenna unit 140 may receive a BS from the wireless power receiver R1, and may then transmit the received BS to a detector 150. For example, the antenna unit 140 may include at least one multiple polarization antenna, and for example, the one multiple polarization antenna may include a plurality of single polarization antennas.

The antenna unit 140 may provide the modulated PS-i in a non-directional manner. Since the modulated PS-i is provided in a non-directional manner, a part of the provided modulated PS-i may be directionally directed to the wireless power receiver R1 while the other part of the provided modulated PS-i may be received by the wireless power receiver R1 in a non-directional manner. As the PS is modulated to have the time-reversal phase of the BS, the PS may be transmitted to the wireless power receiver R1 with high efficiency, since the PS satisfies conditions of constructive interference at the location of the wireless power receiver R1 upon the transmission of the BS to the wireless power transmitter 100. An amount of time required for receiving the BS and transmitting the modulated PS may be expressible in milliseconds (ms), and thus, regardless of the changes in the location of the wireless power receiver R1, the PS may be transmitted to the wireless power receiver R1 with high efficiency.

The BS refers to a signal transmitted by wireless power receiver R1 to enable power transmission with the wireless power transmitter 100. The wireless power transmitter 100 transmits a modulated PS-i corresponding to the beacon signal BS, and thus a step of the wireless power transmitter 100 receiving the beacon signal BS is required prior to a step of transmitting the modulated PS-i. In this regard, a step of synchronizing the wireless power receiver R1 with the wireless power transmitter 100 may be a prerequisite step. For example, the synchronization step may be a step of operating the wireless power transmitter 100 under a condition in which the BS is received.

The BS may be transmitted between the wireless power receiver R1 and the wireless power transmitter 100 via all available paths therebetween. In the drawings, the BS is represented in a straight line for convenience of explanation. However, the BS may not be propagating along the straight line connecting the wireless power receiver R1 and the wireless power transmitter 100. For example, the beacon signal BS may be directly transmitted along a path of a line of sight between the wireless power transmitter 100 and the wireless power receiver R1. However, in some exemplary embodiments, the BS may be directly/indirectly transmitted by reflection, diffraction, and refraction, according to a path that varies with respect to the line of sight.

The antenna unit 140 may further receive a communication signal (CS) (e.g., a CS of FIG. 3) from the wireless power receiver R1. The controller 120 may change or modify the phase and amplitude control algorithm by analyzing a CS (e.g., a CS of FIG. 3). The antenna unit 140 may receive a BS, transmit a PS-i, and receive a CS (e.g., a CS of FIG. 3) at the same time or at different times.

The antenna unit 140 may include a plurality of antennas, and the plurality of antennas may be connected with the modulator 130 in an one-to-one manner or in a many-to-one manner. In addition, the plurality of antennas may be connected with the detector 150 in an one-to-one manner or in a many-to-one manner. The detector 150 may detect the phase and amplitude of the BS. Then, the detector 150 may provide the detected phase and amplitude of the BS to the controller 120. For example, the detector 150 may include a phase detector (not shown) for detecting the phase of the BS and an amplitude detector (not shown) for detecting an amplitude of the BS.

Figure 2:
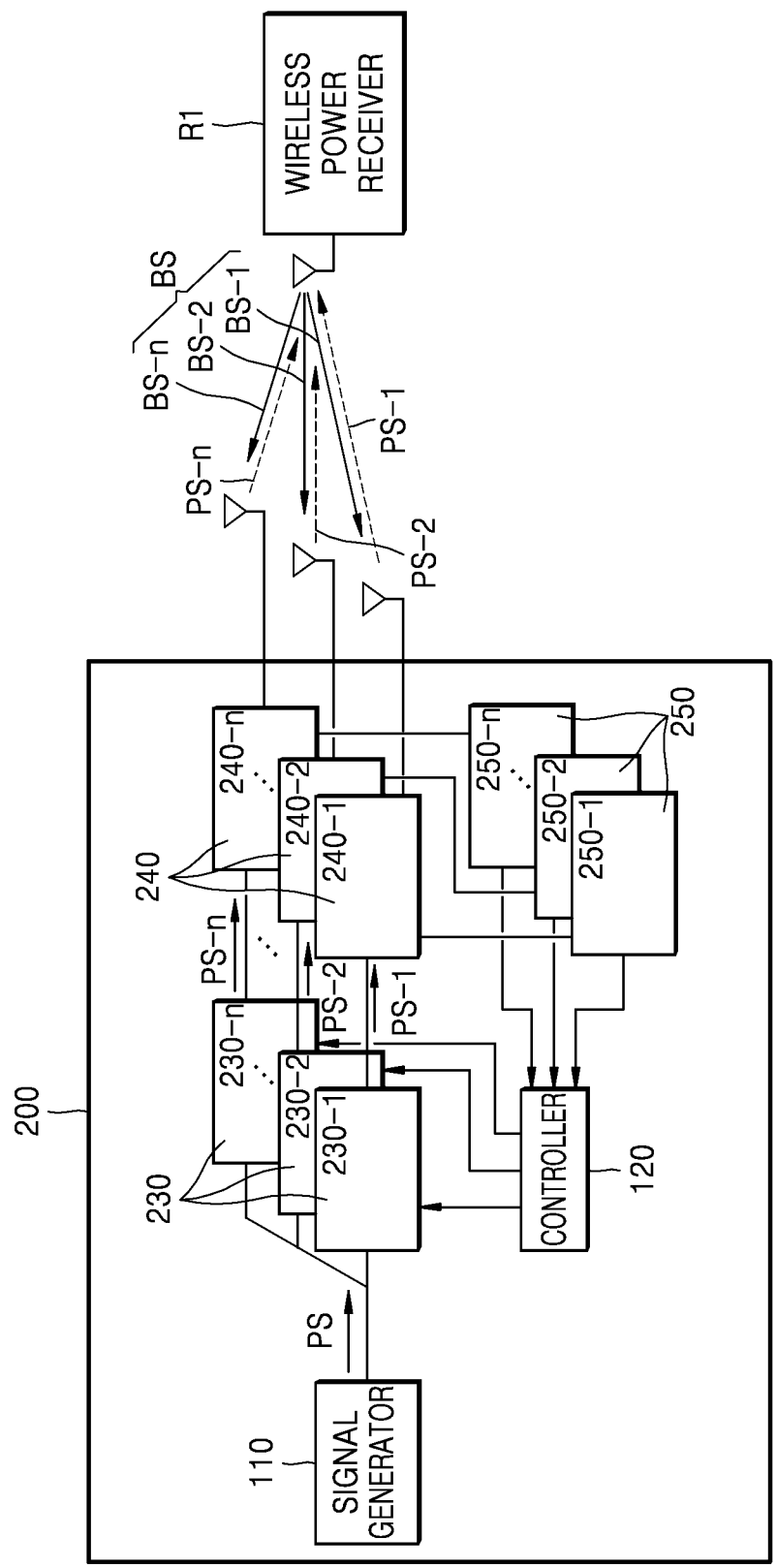
FIG. 2 is a block diagram of a wireless power transmitter, according to another exemplary embodiment.

FIG. 2 is a block diagram of a wireless power transmitter 200, according to another exemplary embodiment. Referring to FIG. 2, the wireless power transmitter 200 may include a modulator 230, an antenna unit 240, and a detector 250, each of which has an array structure. Repeated descriptions of components that are the same as the components of the wireless power transmitter 100 are omitted for conciseness.

The modulator 230 may include a plurality of phase-amplitude modulators 230-1, 230-2, . . . 230-$n$ which are disposed in an array arrangement. The plurality of phase-amplitude modulators 230-1, 230-2, . . . 230-$n$ may each transmit a modulated PS, i.e., PS-1, PS-2, . . . PS-n, to the antenna unit 240. For example, the plurality of phase-amplitude modulators 230-1, 230-2, . . . 230-$n$ may each modulate the PSs, so as to have a time-reversal phase of BSs, i.e., BS-1, BS-2, . . . BS-n, that respectively correspond to the phase-amplitude modulators 230-1, 230-2, . . . 230-$n$. For example, the plurality of phase-amplitude modulators 230-1, 230-2, . . . 230-$n$ may amplify the PSs according to the phase and amplitude control algorithm that is provided by the controller 120.

The antenna unit 240 may include a plurality of antennas 240-1, 240-2, . . . 240-$n$ which are disposed in an array arrangement. The plurality of antennas 240-1, 240-2, . . . 240-$n$ may respectively transmit the modulated PSs, i.e., PS-1, PS-2, . . . PS-n, to the wireless power receiver R1. For example, the plurality of antennas 240-1, 240-2, . . . 240-$n$ may correspond to the plurality of phase-amplitude modulators 230-1, 230-2, . . . 230-$n$ in a one-to-one manner. The plurality of antennas 240-1, 240-2, . . . 240-$n$ may respectively receive the BSs, i.e., BS-1, BS-2, . . . BS-n s power receiver R1. The phase and amplitude of each of the BSs, i.e., BS-1, BS-2, . . . BS-n, may be the same when being transmitted by the wireless power receiver R1. The BSs, i.e., BS-1, BS-2, . . . BS-n, received from the plurality of antennas 240-1, 240-2, . . . 240-$n$ may have different phases and different amplitudes. The BSs, i.e., BS-1, BS-2, . . . BS-n, have different phases and amplitudes because the BSs take different respective paths to reach the plurality of antennas 240-1, 240-2, . . . 240-$n$.

The plurality of antennas 240-1, 240-2, . . . 240-$n$ may not correspond to the plurality of phase-amplitude modulators 230-1, 230-2, . . . 230-$n$ in a one-to-one manner, and in some exemplary embodiments, the plurality of antennas 240-1, 240-2, . . . 240-$n$ may correspond to the plurality of phase-amplitude modulators 230-1, 230-2, . . . 230-$n$ in a many-to-one manner. For example, a plurality of sub-antenna groups (not shown) may correspond to one phase-amplitude modulator 230-1.

The detector 250 may include a plurality of phase-amplitude detectors 250-1, 250-2, . . . 250-$n$ which are disposed in an array arrangement. The plurality of phase-amplitude detectors 250-1, 250-2, . . . 250-$n$ may correspond to plurality of antennas 240-1, 240-2, . . . 240-$n$ in a one-to-one manner. The phase-amplitude detectors 250-1, 250-2, . . . 250-$n$ may each detect the phase and amplitude of respectively corresponding BSs, i.e., BS-1, BS-2, . . . BS-n, and then, provide the beacon signals BS-1, BS-2, . . . BS-n to the controller 120.

The plurality of antennas 240-1, 240-2, . . . 240-$n$ may not correspond to the plurality of phase-amplitude detectors 250-1, 250-2, . . . 250-$n$ in a one-to-one manner, and in some exemplary embodiments, the plurality of antennas 240-1, 240-2, . . . 240-$n$ may correspond to the plurality of phase-amplitude detectors 250-1, 250-2, . . . 250-$n$ in a many-to-one manner. For example, a plurality of sub-antenna groups (not shown) may correspond to one phase-amplitude detector (e.g., a phase-amplitude detector 240-1).

For example, the plurality of phase-amplitude modulators 230-1, 230-2, . . . 230-$n$, the plurality of antennas 240-1, 240-2, . . . 240-$n$, and the plurality of phase-amplitude detectors 250-1, 250-2, . . . 250-$n$ may correspond to each other in a one-to-one manner. The BSs, i.e., BS-1, BS-2, . . . BS-n, which are standard signals for power transmission, are variably received by the plurality of antennas 240-1, 240-2, . . . 240-$n$. Thus, the wireless power transmitter 200 satisfying such a one-to-one relationship may be easily controlled.

The controller 120 may first compute a phase detection value provided by the phase-amplitude detectors 250-1, 250-2, . . . 250-$n$, to thereby compute the time-reversal of the beacon signals BS-1, BS-2, . . . BS-n. For example, the controller 120 may compute a relative phase difference among the BSs, i.e., BS-1, BS-2, . . . BS-n, by comparing phase detection values provided from the phase-amplitude detectors 250-1, 250-2, . . . 250-$n$ with each other. For example, the controller 120 may compute a phase difference between phase detection values provided from the phase-amplitude detectors 250-1, 250-2, . . . 250-$n$ and phase values of reference signals. For example, a reference signal may correspond to a PS generated by the signal generator 110. The controller 120 may compute a time-reversal phase of the BSs, i.e., BS-1, BS-2, . . . BS-n, based on the computed phase difference, and may provide the computed time-reversal phase of the BSs, i.e., BS-1, BS-2, . . . BS-n, to the plurality of phase-amplitude modulators 230-1, 230-2, . . . 230-$n$, respectively.

To calculate an amplitude factor of amplitudes of the BSs, i.e., BS-1, BS-2, . . . BS-n, the controller 120 may compute amplitude detection values provided from the phase-amplitude detectors 250-1, 250-2, . . . 250-$n$, according to the phase and amplitude control algorithm. The controller 120 may provide amplified values of amplitudes computed by each of the BSs, i.e., BS-1, BS-2, . . . BS-n, to the plurality of phase-amplitude modulators 230-1, 230-2, . . . 230-$n$.

Figure 3:
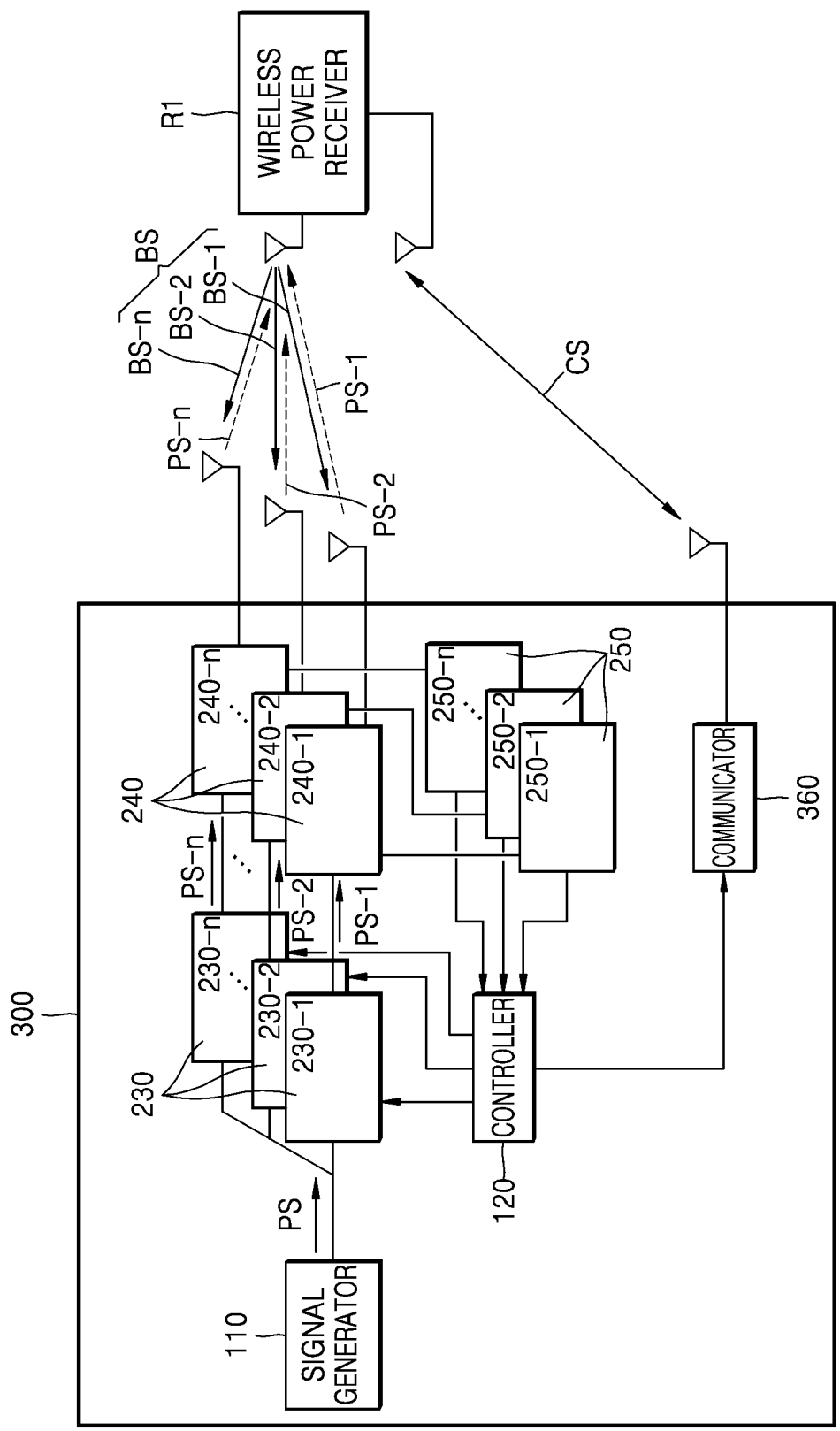
FIG. 3 is a block diagram of a wireless power transmitter, according to another exemplary embodiment.

FIG. 3 is a block diagram of a wireless power transmitter 300, according to another exemplary embodiment. Referring to FIG. 3, the wireless power transmitter 300 may further include a communicator 360. Repeated descriptions of components that are the same as the components of the wireless power transmitters 100 and 200 are omitted for conciseness.

The communicator 360 may receive a communication signal CS from the wireless power receiver R1, and then transmit the communication signal CS to the controller 120. For example, the communication signal CS may include any of a Bluetooth signal, a Wi-Fi signal, or a ZigBee signal. For example, the communication signal CS may include a signal having information related to the power signals PS-1, PS-2, and PS-n (e.g., information about amplitude, intensity, and phase) received from the wireless power receiver R1. For example, the communication signal CS may include a wireless signal having information related to a charge state of the wireless power receiver R1 (e.g., information about the size of transmitted power and a charge rate).

The communicator 360 may receive a CS having information from the wireless power receiver R1, the information corresponding to a start time and an end time of transmission of a power signal (e.g., a power signal PS-i). For example, when the wireless power receiver R1 transmits a CS requiring transmission of a power signal (e.g., a power signal PS-i) to the communicator 360, the communicator 360 may transmit the CS to the controller 120. In this regard, the controller 120 may control each component of the wireless power transmitter 300 under a condition to receive a power signal (e.g., a power signal PS-i). For example, when the wireless power receiver R1 transmits a CS requiring transmission of a power signal (e.g., a power signal PS-i) to the communicator 360, the communicator 360 may transmit the CS to the controller 120. In this regard, the controller 120 may control each of the components of the wireless power transmitter 300 to thereby end the transmission of a power signal (e.g., a power signal PS-i).

The communicator 360 may also transmit the CS. For example, the communicator 360 may transmit the CS to the wireless power receiver R1, the CS having various information related to a state of the wireless power transmitter 300.

The controller 120 may change or modify the phase and amplitude control algorithm based on the CS. For example, when the wireless power receiver R1 is completely charged, the controller 120 may stop the power transmission of the wireless power transmitter 300. For example, in the case that the power magnitudes of the PSs, i.e., PS-1, PS-2, ... PS-n received by the wireless power receiver R1 are smaller than a predetermined value of power, the controller 120 may change the phase and amplitude control algorithm or adjust an amplitude factor of an amplitude. For example, the wireless power receiver 300 may form a feedback system with the CS received from the wireless power receiver R1. The wireless power receiver 300 according to an exemplary embodiment may change the phase and amplitude control algorithm and finely adjust an amplitude factor of an amplitude in real time, so as to increase the efficiency of the power transmission.

Figure 4:
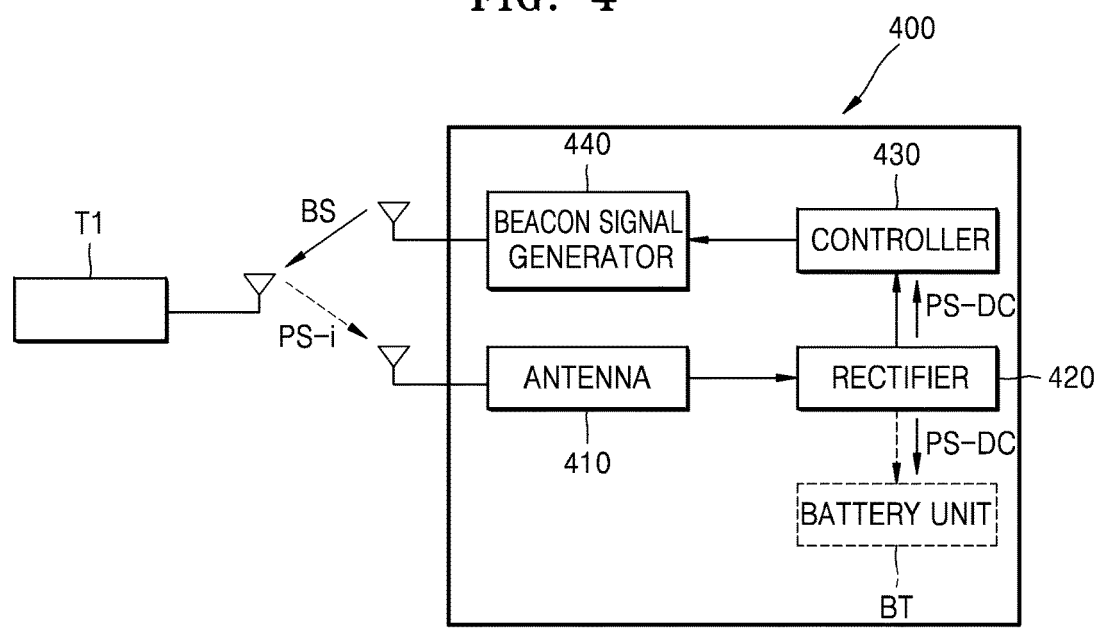
FIG. 4 is a block diagram of a wireless power receiver, according to an exemplary embodiment.

FIG. 4 is a block diagram of a wireless power receiver 400, according to an exemplary embodiment. Referring to FIG. 4, the wireless power receiver 400 includes an antenna 410, a rectifier 420, a controller 430, and a beacon signal generator 440. The wireless power receiver 400 receives a PS (e.g., a PS-i) modulated by the wireless power transmitter T1 according to an exemplary embodiment, and may also transmit a BS to the wireless power transmitter T1.

The antenna 410 may include a single antenna or a plurality of antennas. For example, the antenna 410 may include at least one multiple polarization antenna. For example, at least one of all the antennas included in the wireless power transmitter T1 and the wireless power receiver 400 may include a multiple polarization antenna.

The rectifier 420 may rectify the PS (e.g., the PS-i), which is transmitted as an AC signal, into a direct current (DC) signal (e.g., a PS-DC signal). The PS-DC signal, which is the rectified PS, may be directly supplied to the wireless power receiver 400 to perform operations thereof. For example, the PS-DC signal may also be supplied to the controller 430. Alternatively, the PS-DC signal may be supplied to a battery unit BT shown by dashed lines. For example, the BT is charged by the PS-DC signal, to thereby supply power to the wireless power receiver 400. For example, when the BT is completely charged by the PS-DC signal, the BT may transmit a signal to the control unit 430 to indicate the complete charge of the BT. The battery unit BT may include one or more batteries.

The rectifier 420 and the antenna 410 satisfy a one-to-one relationship therebetween, thereby forming a Rectenna structure.

The controller 430 may process various information regarding a battery (not shown) of the wireless power receiver 400 and a size of received power, and may also control components of the wireless power receiver 400. For example, the controller 430 may control the rectifier 420 and the beacon signal generator 440.

The beacon signal generator 440 generates a BS and transmits the BS to the wireless power transmitter T1. For example, the beacon signal generator 440 includes an additional antenna for transmission of the BS. For example, the beacon signal generator 440 may transmit the BS via an antenna of the antenna 410, instead of including an additional antenna. For example, the BS may be an AC signal having a constant amplitude and a constant phase. The BS may be transmitted in a non-directional manner to the wireless power transmitter T1, and then, may reach the wireless power transmitter T1 via any of various paths.

The wireless power receiver 400 may further include a power management module (not shown) that is controlled by the controller 430. The power management module (not shown) may have a maximum power point-tracking structure that can increase power receiving efficiency to a maximum. In addition, the power management module (not shown) may have a DC converter structure that can safely supply a voltage to the wireless power receiver 400 or other external devices by boosting or adjusting a voltage.

Figure 5:
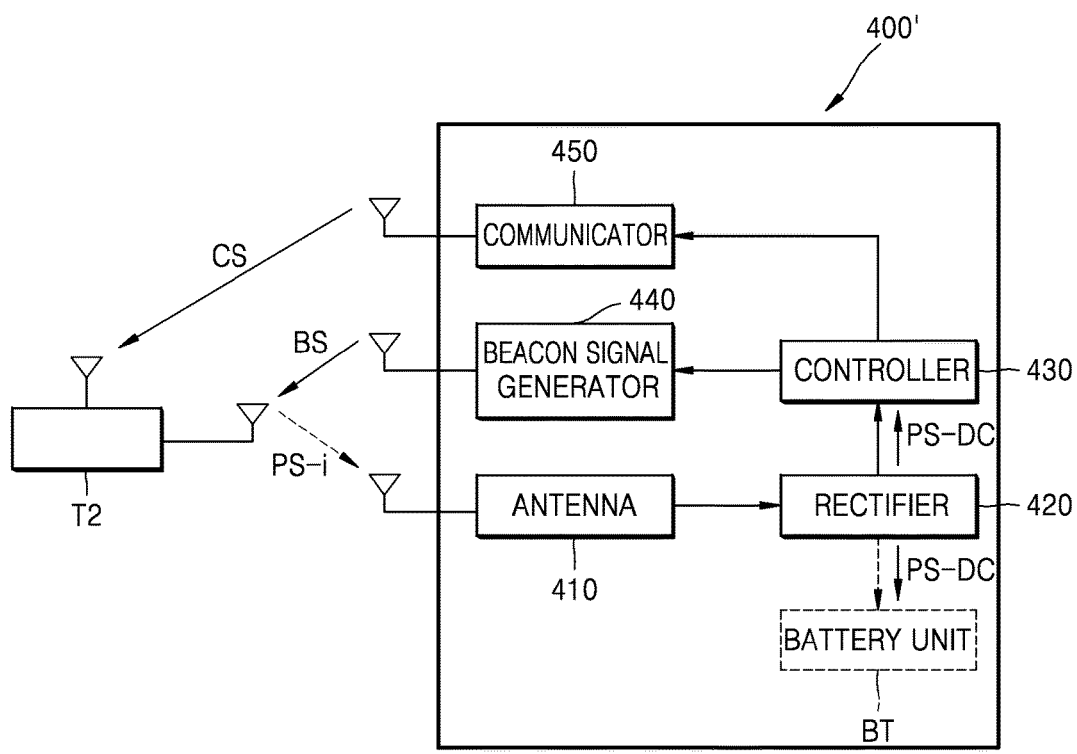
FIG. 5 is a block diagram of a wireless power receiver, according to another exemplary embodiment.

FIG. 5 is a block diagram of a wireless power receiver 400', according to another exemplary embodiment. Referring to FIG. 5, the wireless power receiver 400' may further include a communicator 450. Other components of the wireless power receiver 400', minus the communicator 450, are substantially the same as those of the wireless power receiver 400, and thus repeated descriptions thereof are omitted for conciseness. The wireless power receiver 400' may exchange a CS with a wireless power transmitter T2 via the communicator 450. For example, the CS may include any of a Bluetooth signal, a Wi-Fi signal, or a ZigBee signal. For example, the CS may include a signal having information (e.g., information about amplitude, intensity, and phase) related to PSs, e.g., PS-1, PS-2, ... PS-n, received from the wireless power receiver R1. For example, the CS may include a wireless signal having information related to a charge state of the wireless power receiver R1 (e.g., information about the size of transmitted power and a charge rate).

Figure 6:
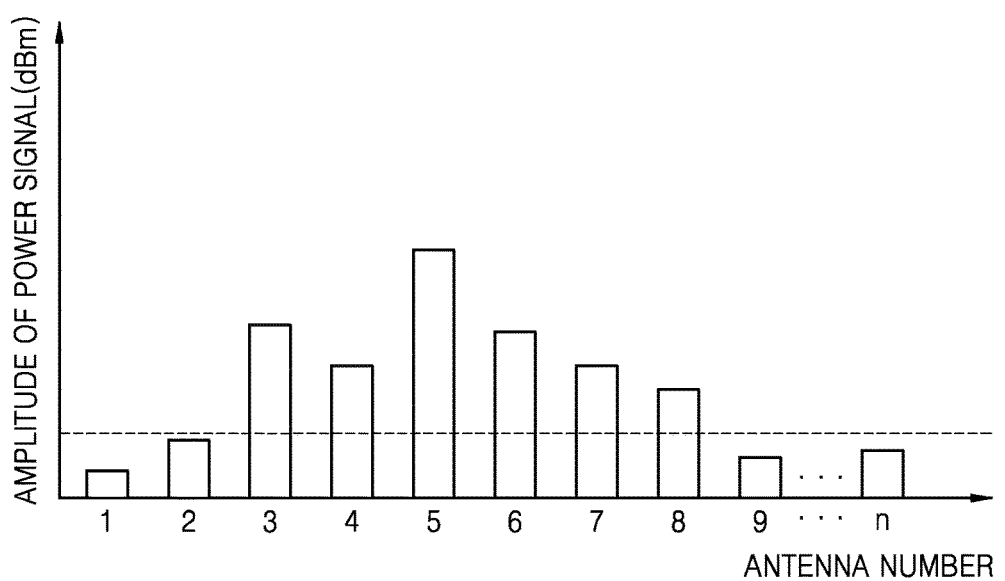
FIG. 6 is a graph showing beacon signals received from a wireless power transmitter, according to an exemplary embodiment.

FIG. 6 is a graph showing BSs received from a wireless power transmitter, according to an exemplary embodiment. Referring to FIG. 6, the x-axis of the graph indicates an antenna number, and the y-axis of the graph indicates an amplitude (in dBm) of BSs received by each antenna. At the time of transmission of BSs from the wireless power receiver, the BSs each have a constant phase and a constant amplitude, but the BSs reach the antennas via various paths, wherein changes in the phase and the amplitude are as described above. Therefore, as shown in FIG. 6, amplitudes of the BSs received by each antenna may vary with respect to each other.

Referring to FIG. 6, it is confirmed that the amplitudes of the BSs received by antenna numbers 3 to 8 are greater than those of the BSs received by antenna numbers 1, 2, and 9 to n. That is, in consideration of characteristics of time-reversal power transmission methods, when PSs having the same amplitudes are assumed to be transmitted to antenna numbers 1 to 8, power transmission levels at antenna numbers 3 to 8 may be higher than those at antenna numbers 1 and 2. The maximum level of transmittable power is limited in the wireless power transmitter. Thus, when a PS having a greater amplitude than an amplitude of a BS is transmitted to an antenna having a relatively large amplitude of a BS, the power transmission efficiency of the wireless power transmitter may increase.

For example, it may be determined whether an amplitude size of BSs received by each antenna is greater than a standard value represented as a standard value by a dashed line. For the antenna having a smaller amplitude size than the standard value, the phase and amplitude control algorithm may be changed to thereby increase power transmission efficiency. A detailed description thereof is described below with reference to FIG. 9.

Figure 7:
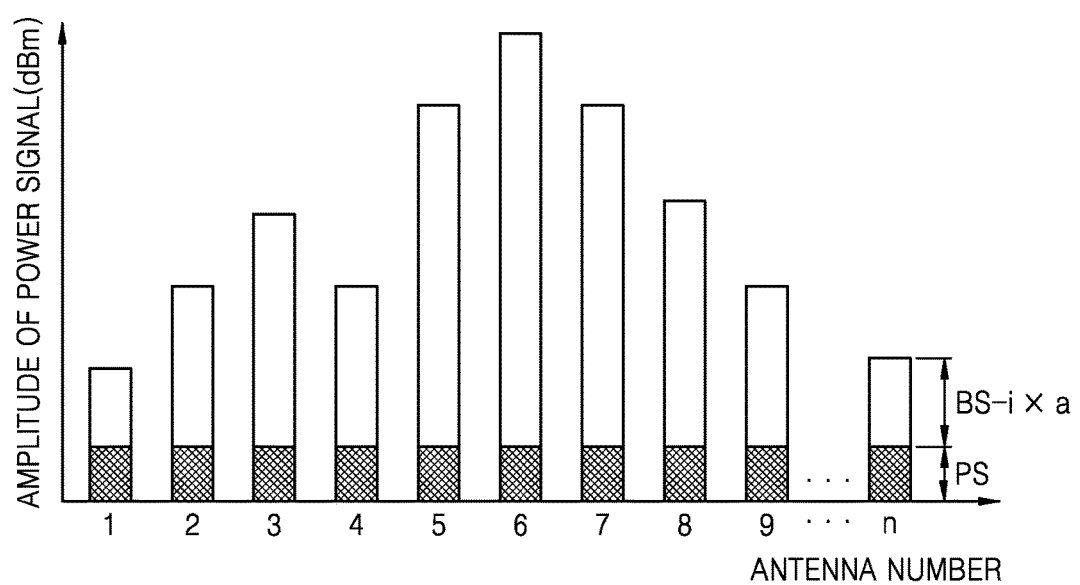
FIG. 7 is a graph showing amplifications of power signals amplified according to a phase and amplitude control algorithm, according to an exemplary embodiment.

FIG. 7 is a graph showing amplifications of PSs amplified by a phase and amplitude control algorithm, according to an exemplary embodiment. A first phase and amplitude control algorithm according to an exemplary embodiment is as described below.

Algorithm (1): An amplitude of a BS is multiplied by a constant factor, and then, the resulting amplitude of the BS is added to a PS, thereby amplifying the PS.

Referring to FIG. 7, the phase and amplitude control algorithm may amplify the PS by as much as factors used to multiply the amplitude of the BSs received by each antenna, thereby transmitting the amplified PS to the wireless power receiver. For example, the modulator may modulate the PS, which is generated by the signal generator, according to the first phase and amplitude control algorithm, so that the PS is modulated in a way that the greater amplitude of the BS, the greater the weight value the PS. Consequently, an antenna having a greater amplitude of the BS transmits a PS with a greater amplitude, thereby increasing the efficiency of power signal transmission.

For example, an amplitude of the PS modulated according to the first phase and amplitude control algorithm may be represented by BS-i*a+PS, wherein BS-i indicates an amplitude size of a BS received by an antenna corresponding to the index i, a indicates a predetermined factor which is any integer or rational number greater than zero (0), and PS indicates an amplitude of a PS generated by a signal generator. For example, a may be determined by a controller.

Figure 8:
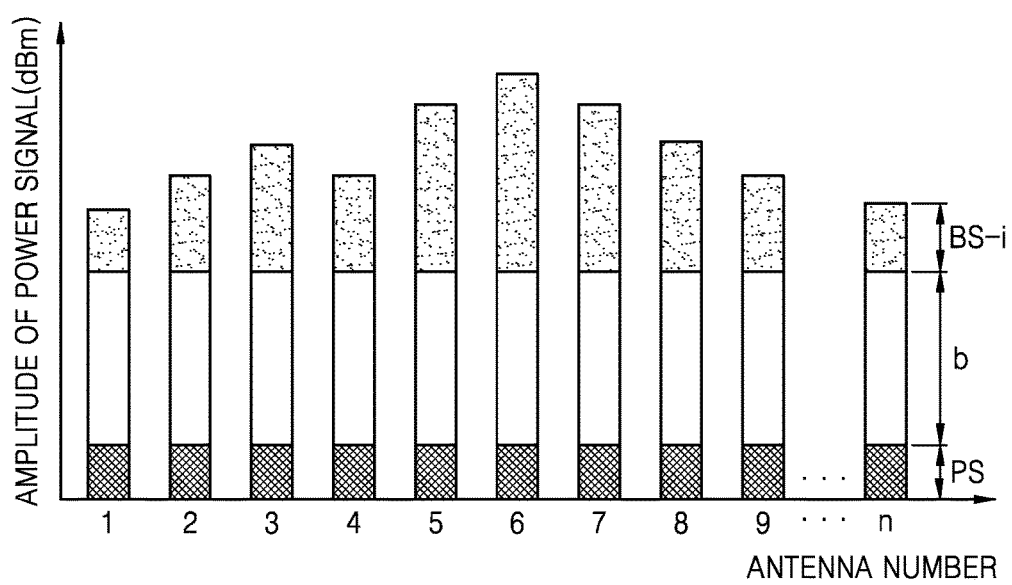
FIG. 8 is a graph showing amplification of power signals amplified according to a phase and amplitude control algorithm, according to another exemplary embodiment.

FIG. 8 is a graph showing amplification of PSs amplified according to a phase and amplitude control algorithm, according to another exemplary embodiment. A second phase and amplitude control algorithm according to the present exemplary embodiment is as described below.

Algorithm (2): An amplitude of a BS is added with an amplitude of a constant value, and then, the resulting amplitude is added to a PS, thereby amplifying the PS.

Referring to FIG. 8, an amplitude of a BS received by each antenna is added to an amplitude of a same value according to the second phase and amplitude control algorithm to thereby amplify a PS, and accordingly, the amplified PS is transmitted to a wireless power receiver. For example, the modulator may modulate the PS, which is generated by the signal generator, according to the first phase and amplitude control algorithm, so that the PS is modulated in a way that the greater amplitude of the BS, the greater the weight value the PS. Consequently, an antenna having a greater amplitude of the BS transmits a PS with a greater amplitude, thereby increasing the efficiency of power signal transmission. The second phase and amplitude control algorithm is configured to add the same amplitude to each antenna, and thus a size difference of amplitudes among the power signals transmitted by each antenna may be smaller than a size difference of amplitudes among the PSs transmitted by each antenna according to the phase and amplitude control algorithm.

For example, an amplitude of the PS modulated according to the second phase and amplitude control algorithm may be represented by BS-i+b+PS, wherein BS-i indicates an amplitude size of a BS received by an antenna corresponding to the index i, b indicates a predetermined amplitude value which is any amplitude value equal to or greater than zero (0), and PS indicates an amplitude of a PS generated by a signal generator. For example, b may be determined by a controller.

Figure 9:
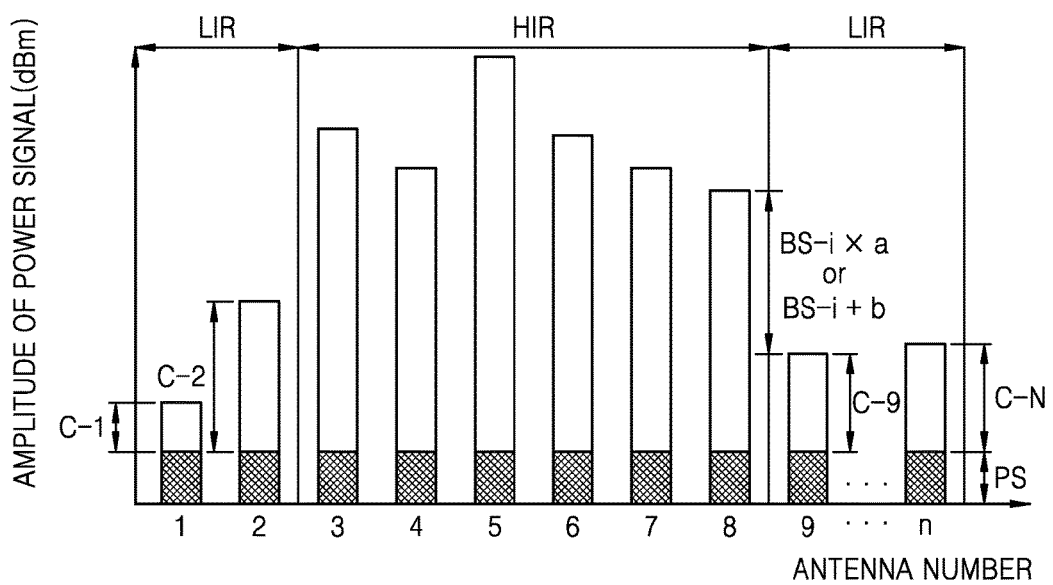
FIG. 9 is a graph showing amplification of power signals amplified according to a phase and amplitude control algorithm, according to another exemplary embodiment.

FIG. 9 is a graph showing amplification of PSs amplified according to a phase and amplitude control algorithm, according to another exemplary embodiment. Third, fourth, fifth, and sixth phase and amplitude control algorithms are each as described below.

Algorithm (3): An amplitude of a BS is multiplied by a constant factor, and then, the resulting amplitude of the BS is added to a PS, thereby amplifying the PS, wherein the amplitude of the PS is not amplified with respect to the BS having an amplitude that is less than or equal to a predetermined threshold value.

Algorithm (4): An amplitude of a BS is added with an amplitude of a constant value, and then, the resulting amplitude is added to a PS, thereby amplifying the PS, wherein the amplitude of the PS is not amplified with respect to the BS having an amplitude that is less than or equal to a predetermined threshold value.

Algorithm (5): An amplitude of a BS is multiplied by a constant factor, and then, the resulting amplitude of the BS is added to a PS, thereby amplifying the PS, wherein the amplitude of the PS is not amplified with respect to the BS having an amplitude that is less than or equal to a predetermined threshold value.

Algorithm (6): An amplitude of a BS is added with an amplitude of a constant value, and then, the resulting amplitude is added to a PS, thereby amplifying the PS, wherein the amplitude of the PS is not amplified with respect to the BS having an amplitude that is less than or equal to a predetermined threshold value.

Each of the third, fourth, fifth, and sixth algorithms may be a modification of the first and second phase and amplitude control algorithms. Depending on whether the amplitude of the BS is greater than a threshold value, antennas may be divided into antennas belonging to a high intensity region (HIR) and antennas belonging to a low intensity region (LIR). Referring to FIG. 8, antennas represented by numbers 3 to 8 belong to the HIR, while antennas represented by numbers 1, 2, and 9 belong to the LIR.

According to the third, fourth, fifth, and sixth algorithms, antennas belonging to the HIR may amplify and transmit PSs, whereas antennas belonging to the LIR transmit PSs without amplifying the PSs, or variably amplify and transmit the PSs.

According to the fifth and sixth algorithms, the PSs belonging to the LIR may be variably amplified. For example, according to fifth and sixth algorithms, the amplification of the PSs may be adjusted in a variable manner by referring to the CSs received from the wireless power receiver. For example, if a total power transmission amount of the wireless power transmitter is fixed, an amplitude of a PS transmitted by an antenna belonging to LIR may be variably adjusted while an amplitude of a PS transmitted by an antenna belonging to HIR is maintained. The wireless power transmitter and the wireless power receiver may form a feedback system, and thus the amplitude of the PS transmitted by an antenna belonging to LIR may be adjusted in a variable manner to thereby yield a relatively great real-time amount of power provided from the CS.

For example, the amplitude of the PS having LIR and modulated according to the fifth and sixth phase and amplitude control algorithms may be represented by C-i+PS, wherein C-i indicates an amplitude size of a BS received by an antenna corresponding to the index i and PS indicates an amplitude of a PS generated by a signal generator. C-i may be determined by a controller, and for example, C-i may be determined by a controller by referring to a CS.

The first to sixth phase and amplitude control algorithms are only exemplary, and the controller may provide various phase and amplitude control algorithms to the modulator in order to increase transmission efficiency of PSs.

Figure 10:
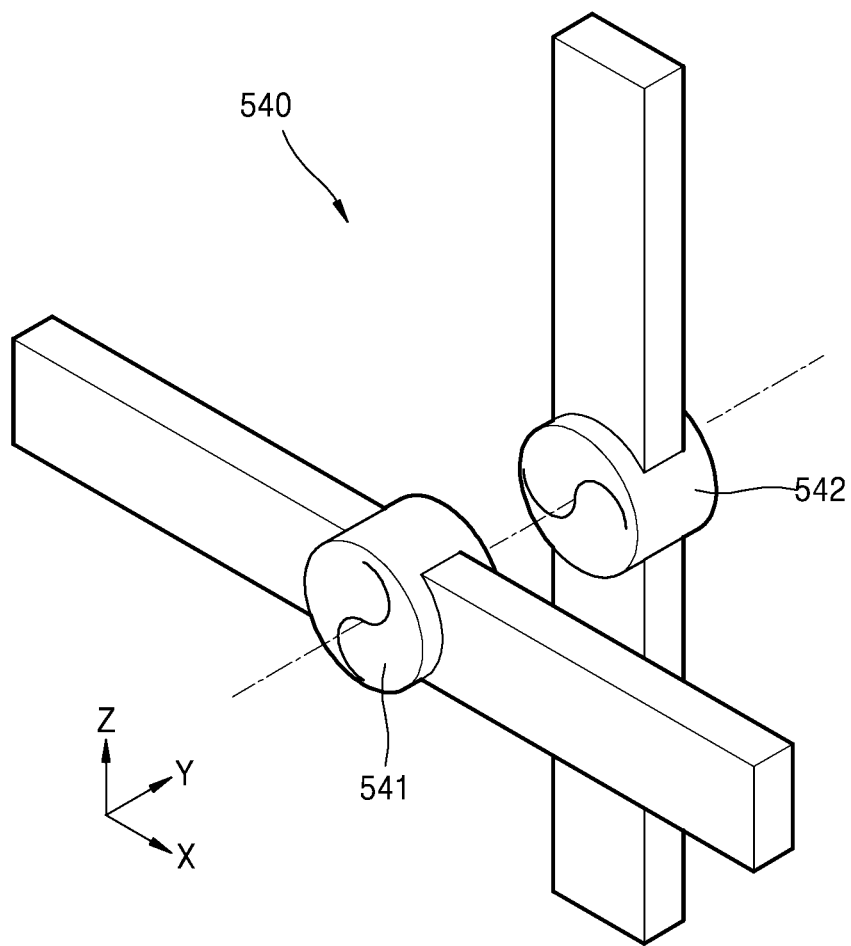
FIG. 10 is a schematic diagram of an antenna, according to an exemplary embodiment.

FIG. 10 is a schematic diagram of an antenna 540, according to an exemplary embodiment. Referring to FIG. 10, the antenna 540 has a double polarization antenna structure, and includes a first polarization antenna 541 and a second polarization antenna 542.

A polarization direction of the first polarization antenna 541 and a polarization direction of the second polarization antenna 542 may not be parallel to each other. For example, a polarization direction of the first polarization antenna 541 and a polarization direction of the second polarization antenna 542 may be arranged to be perpendicular to each other. For example, the first polarization antenna 541 may be arranged longitudinally in an x-axis direction, and the second polarization antenna 542 may be arranged side by side longitudinally in a z-axis direction. For example, the first polarization antenna 541 and the second polarization antenna 542 may each be a single polarization antenna.

The antenna 540 may be included in an antenna unit (e.g., the antenna unit 140 of FIG. 1) in a wireless power transmitter (e.g., the wireless power transmitter 100 of FIG. 1), or may be included in an antenna unit (e.g., the antenna 410 of FIG. 4) in a wireless power receiver (e.g., the wireless power receiver 400 of FIG. 4).

Figure 11:
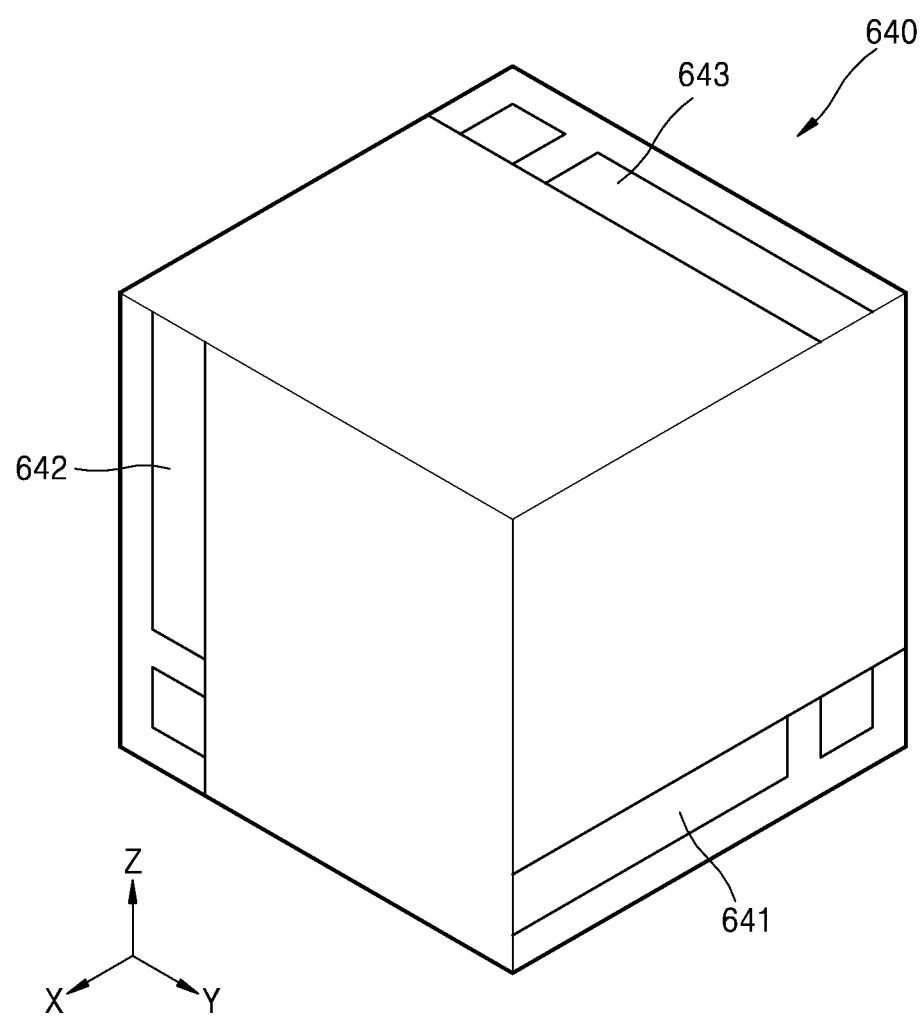
FIG. 11 is a schematic diagram of an antenna, according to another exemplary embodiment.

FIG. 11 is a schematic diagram of an antenna 640, according to another exemplary embodiment. Referring to FIG. 11, the antenna 640 has a triple polarization antenna structure, and includes a first polarization antenna 641, a second polarization antenna 642, and a third polarization antenna 643. For example, the first polarization antenna 641, the second polarization antenna 642, and the third polarization antenna 643 may each be a single polarization antenna.

The first polarization antenna 641, the second polarization antenna 642, and the third polarization antenna 643 may be arranged so as to be not parallel to each other. For example, a polarization direction of the first polarization antenna 641, a polarization direction of the second polarization antenna 642, and a polarization direction of the third polarization antenna 643 may be arranged to be perpendicular to each other (i.e., mutually orthogonal). For example, the first polarization antenna 641 may be arranged side by side longitudinally in an y-axis direction, the second polarization antenna 642 may be arranged longitudinally in a z-axis direction, the third polarization antenna 643 may be arranged longitudinally in an x-axis direction.

The antenna 640 may be included in an antenna unit (e.g., the antenna unit 140 of FIG. 1) in a wireless power transmitter (e.g., the wireless power transmitter 100 of FIG. 1), or may be included in an antenna unit (e.g., the antenna 410 of FIG. 4) in a wireless power receiver (e.g., the wireless power receiver 400 of FIG. 4).

Figure 12:
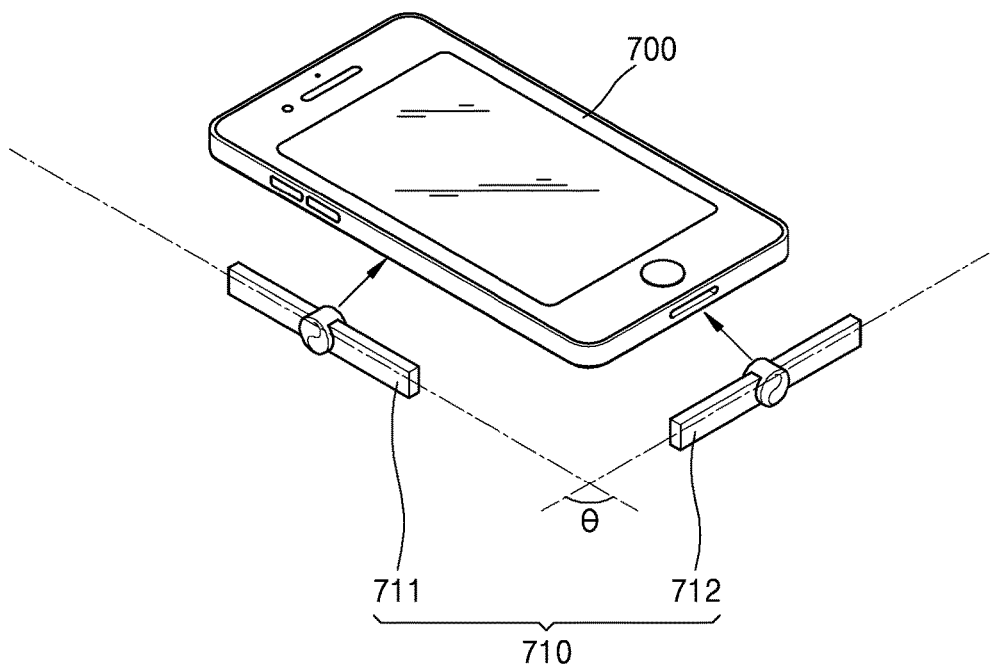
FIG. 12 is a schematic diagram of a wireless power receiver, according another exemplary embodiment.

FIG. 12 is a schematic diagram of a wireless power receiver 700, according to another exemplary embodiment. Referring to FIG. 12, the wireless power receiver 700 may be a mobile phone, but is not limited thereto. The wireless power receiver 700 according to an exemplary embodiment may be one wireless communication device from among a mobile phone, a portable headset, a laptop PC, a tablet PC, a portable MP3 player, a portable video player, a smart watch, and a wireless sensor.

The wireless power receiver 700 may include a multiple polarization antenna 710. For example, the multiple polarization antenna 710 may include a first polarization antenna 711 and a second polarization antenna 712 arranged so as to be not parallel to each other. The first polarization antenna 711 and the second polarization antenna 712 may be arranged to have a predetermined angle θ therebetween. The angle θ may vary depending on types of a wireless power device. For example, the angle θ may be 90 degrees or close to 90 degrees.

The wireless power receiver 700 may have an external shape having side surfaces connecting a first pair of surfaces that face each other and a second pair of two surfaces that face each other. For example, the external shape of the wireless power receiver 700 may be a rectangular shape. The multiple polarization antenna 710 may include at least two polarization antennas that are arranged on the side surfaces to have a predetermined angle θ with respect to each other. For example, when the wireless power receiver 700 has a cuboid shape or a polyhedral shape in a similar form with the cuboid shape, the first polarization antenna 711 and the second polarization antenna 712 may each be provided on side surfaces that do not face each other. For example, a side surface may refer to a small surface in which an area of surfaces facing each other is relatively small.

Figure 13:
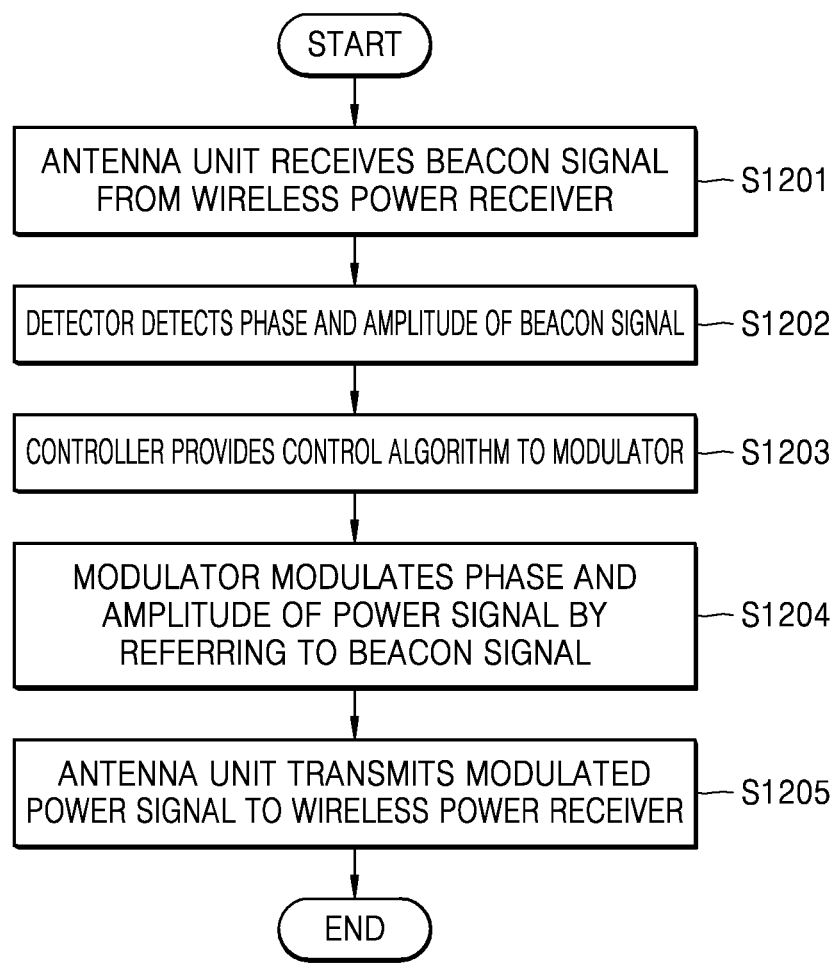
FIG. 13 is a flowchart of a method of wireless power transmission, according to an exemplary embodiment.

FIG. 13 is a flowchart of a method of wireless power transmission, according to an exemplary embodiment.

Referring to FIG. 13, in operation S1201, an antenna unit of a wireless power transmitter receives a BS from a wireless power receiver. In operation S1202, a detector of the wireless power transmitter detects each of the phase and amplitude of the received BS. Then, the detector transmits the detected phase and amplitude of the received BS to a controller. In operation S1203, the controller provides a phase and amplitude control algorithm to a modulator. In addition, the controller provides, to the modulator, an extent of amplification of the amplitude of the received BS and a time-reversal phase of the received BS based on calculation by referring to the phase and amplitude of the received BS. In operation S1204, the modulator modulates the phase and amplitude of a PS based on the BS received from the wireless power receiver. Then, the modulated PS has a time-reversal phase compared to the phase of the BS, and an amplified amplitude compared to the amplitude of the BS. In operation S1205, the antenna unit of the wireless power transmitter transmits the modulated PS to a wireless power receiver.

Figure 14:
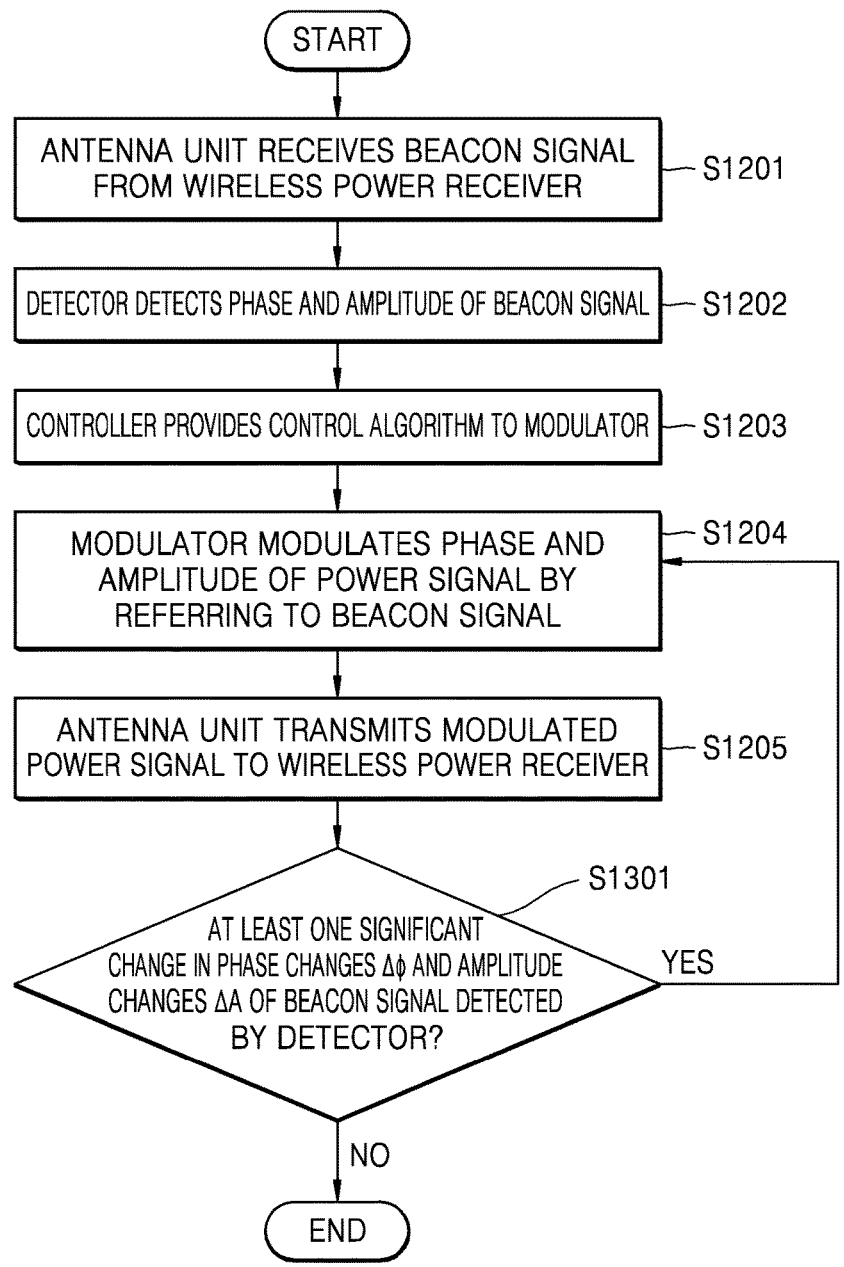
FIG. 14 is a flowchart of a method of wireless power transmission, according to another exemplary embodiment.

FIG. 14 is a flowchart of a method of wireless power transmission, according to another exemplary embodiment. In FIG. 14, a feedback system is additionally utilized for the method of wireless power transmission shown in FIG. 13, and thus repeated descriptions thereof are omitted for conciseness.

After operation S1205 proceeds or in the middle of operation S1205, the detector performs feedback operation S1301 for detecting changes in the phase and amplitude of the BS received by the wireless power transmitter. The standard for determining changes in feedback operation S1301 is based on the phase and amplitude of the BS measured at operation S1202.

When either of the phase and amplitude of the BS measured at the feedback operation S1301 is changed by a greater amount than a preset value with respect to the phase and amplitude of the BS measured at operation S1202, such a change may be construed as a change in the state of the wireless power receiver. For example, when a phase change rate of the BS is denoted as $\Delta\varphi$, an amplitude change rate of the BS is denoted as $\Delta A$, a preset phase standard value is denoted as $\varphi_r$, and a preset amplitude standard value is denoted as $A_r$, in the case of $\Delta\varphi > \varphi_r$ or $\Delta A > A_r$, the controller may determine that the state of the wireless power receiver is changed. For example, the location of the wireless power receiver may be changed or the wireless power receiver may be in a moving state. For example, there may be an obstacle in the space where the wireless power receiver and the wireless power transmitter are located, thereby changing the state of power transmission.

The standard for the preset values $\varphi_r$ and $A_r$ for determining the change rates of the phase and amplitude of the BS may be set by performing a simulation or an experiment. For example, the preset values $\varphi_r$ and $A_r$ may be already stored in the controller or in a memory unit. For example, the preset values $\varphi_r$ and $A_r$ may be randomly set by a user.

In the feedback operation S1301, when the detector detects and transmits changes of phase and amplitude of the BS to the controller, the controller computes an adjusted weight value base on a respective size of each of the changes of the phase and amplitude of the BS. In the case of large changes, the next operation returns to operation S1204 to thereby recompute an extent of modulation of the phase and amplitude of the BS based on the changed BS. In the case of negligible changes, the controller maintains the weight value, and thus transmits a PS having the same phase and the same amplitude already calculated in operation S1203.

FIG. 15 is a flowchart of a method of wireless power transmission, according to another exemplary embodiment. In FIG. 15, an operation related to a CS is added to the method of wireless power transmission shown in FIG. 13, and thus repeated descriptions thereof are omitted for conciseness.

After operation S1205 proceeds or in the middle of operation S1205, a communicator of the wireless power transmitter receives a CS from the wireless power receiver (operation S1401). Following operation S1401 in which the CS is received, the controller may modify a phase and amplitude control algorithm based on the received CS (operation S1402). For example, when an amount of transmitted power is insufficient based on the CS received from the wireless power receiver, the controller may change the phase and amplitude control algorithm to a different algorithm and then, provide the different algorithm to the modulator, thereby increasing the amount of power. Alternatively, the controller may modulate an amplitude rate while maintaining the same phase and amplitude control algorithm. For example, in the first to sixth algorithms, a b, and c-i corresponding to variables of the amplitude rate may be modified.

Operation S1401 in which the CS is received and operation S1402 in which the phase and amplitude control algorithm are modified/changed may be performed simultaneously or at varying times with respect to operation S1205.

In addition, when the wireless power receiver is under a fully-charged condition based on the CS received from the wireless power receiver, the power transmission of the wireless power transmitter may be discontinued.

The wireless power transmitter and the wireless power receiver of the exemplary embodiments described above may form a wireless power transceiver system. For example, the wireless power transceiver system may include a beacon signal generator for generating a BS and a wireless power receiver including an antenna capable of receiving a PS from the wireless power transmitter and transmitting the BS. For example, the wireless power transceiver system may include a detector for detecting the phase and amplitude of the BS, a modulator for modulating the phase and amplitude of a PS so that the phase of the PS has a time-reversal phase of the BS and the amplitude of the PS is amplified according to a phase and amplitude control algorithm, and a controller for calculating the time-reversal phase of the BS and providing the phase and amplitude control algorithm to the modulator.

The wireless power transmitter according to one or more exemplary embodiments may be capable of transmitting power with high power transmission efficiency, even if a location of a wireless power receiver is not specifically known. In some exemplary embodiments, a wireless power transmitter according to the present inventive concept may be also capable of transmitting power wirelessly, even if the wireless power transmitter and the wireless power receiver are not able to communicate via a straight line path or there is an obstacle.

The wireless power transmitter according to one or more exemplary embodiments may transmit a PS of which a phase is time reversed with respect to the phase of the BS transmitted by the wireless power receiver and an amplitude is amplified. The wireless power transmitter according to one or more exemplary embodiments may transmit a PS with high efficiency upon a constructive interference of the PS caused at a location of the wireless power receiver.

The wireless power transmitter according to one or more exemplary embodiments may adjust an increase rate of the amplitude of the PS according to the phase and amplitude control algorithm to thereby transmit the PS with high efficiency.

The wireless power receiver according to one or more exemplary embodiments may transmit a CS having information about a received PS to the wireless power transmitter. The wireless power transmitter may revise the phase and amplitude of a power signal depending on the communication signal SC, thereby transmitting the power signal with high efficiency.

In addition, the wireless power transmitter and the wireless power receiver according to one or more exemplary embodiments may include a multiple polarization antenna to match a polarization direction upon transmission of a power signal, thereby transmitting the power signal with high efficiency.

According to the one or more exemplary embodiments, to help understand the present inventive concept, a wireless power transmitter using a phase and amplitude control algorithm and a wireless power receiver are described and illustrated in the figures. However, it should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While exemplary embodiments have been described with reference to the figures, it will be understood by those of ordinary skill in the art that various changes in form and details may be made therein without departing from the spirit and scope as defined by the following claims.

What is claimed is:

1. A wireless power transmitter comprising:
a signal generator configured to generate power signals;
a detector configured to detect a phase and an amplitude of beacon signals received from a wireless power receiver;
a modulator configured to modulate a phase and an amplitude of the power signals generated by the signal generator to be time reversed based on the received beacon signals and to be amplified, respectively;
a controller configured to provide a phase and amplitude control algorithm to be executed by the modulator; and
a plurality of antennas configured to receive the beacon signals and to transmit the modulated power signals to the wireless power receiver,
wherein the controller assigns a respective weight value for each of the power signals to the modulator based on the phase and amplitude control algorithm,
wherein the amplitude of the power signals generated by the signal generator is amplified in a way that a greater the amplitude of the respective beacon signal received by a corresponding antenna of the plurality of antennas, a greater the weight value for amplifying the respective power signal transmitted by the corresponding antenna, and
wherein the detector is further configured to perform feedback operation for detecting a phase and an amplitude of modified beacon signals over time, and detect respective rates of change as a function of time in the phase and the amplitude of the beacon signals, and the modulator is further configured to perform a time reversal process on the phase of the power signals and to amplify the amplitude of the power signals based on the modified beacon signals when at least one of the detected respective rates of change exceeds a predetermined value.

2. The wireless power transmitter of claim 1, wherein the modulator comprises a plurality of phase-amplitude modulators, and
wherein the plurality of antennas has a one-to one correspondence or a many-to-one correspondence with respect to the plurality of phase-amplitude modulators.

3. The wireless power transmitter of claim 1, wherein the detector comprises a plurality of phase-amplitude detectors and
wherein the plurality of antennas has a one-to one correspondence or a many-to-one correspondence with respect to the plurality of phase-amplitude detectors.

4. The wireless power transmitter of claim 1, wherein the phase and amplitude control algorithm operates to amplify the power signals by combining amplitudes of the power signals with amplitudes of the beacon signals that is multiplied by a predetermined factor.

5. The wireless power transmitter of claim 4, wherein the phase and amplitude control algorithm operates not to amplify at least one from among the power signals corresponding to a beacon signal having an amplitude that is less than or equal to a predetermined threshold value from among the beacon signals.

6. The wireless power transmitter of claim 1, wherein the phase and amplitude control algorithm operates to amplify the power signals by combining amplitudes of the power signals with amplitudes of the beacon signals and amplitudes of a predetermined value.

7. The wireless power transmitter of claim 6, wherein the phase and amplitude control algorithm operates not to amplify at least one from among the power signals corresponding to a beacon signal having an amplitude that is less than or equal to a predetermined threshold from among the beacon signals.

8. The wireless power transmitter of claim 1, wherein the plurality of antennas are further configured to receive communication signals from the wireless power receiver and to provide the received communication signals to the controller, and
the controller is further configured to analyze the communication signals in order to adjust the modulation of the phase and the amplitude of the power signals.

9. The wireless power transmitter of claim 8, wherein the controller is further configured to modify the phase and amplitude control algorithm based on the communication signals.

10. The wireless power transmitter of claim 1, further comprising a communicator configured to receive communication signals from the wireless power receiver and to transmit the received communication signals to the controller,
wherein the controller is further configured to analyze the communication signals in order to adjust the modulation of the phase and the amplitude of the power signals.

11. The wireless power transmitter of claim 1, wherein the plurality of antennas comprise at least one multiple polarization antenna.

12. The wireless power transmitter of claim 1, wherein the wireless power receiver comprises at least one multiple polarization antenna.

13. A wireless power receiver comprising:
at least one multiple polarization antenna receiving wireless power signals from the wireless power transmitter of claim 1;
a rectifier configured to rectify the received wireless power signals into direct current signals; and
a beacon signal generator configured to transmit the beacon signals to the wireless power transmitter.

14. The wireless power receiver of claim 13, further comprising a communicator configured to provide communication signals to the wireless power transmitter.

15. The wireless power receiver of claim 13, wherein the wireless power receiver includes at least one from among a mobile phone, a portable headset, a laptop PC, a tablet PC, a portable MP3 player, a portable video player, a smart watch, and a wireless sensor.

16. The wireless power receiver of claim 13, wherein the wireless power receiver has an external shape having side surfaces configured to connect a first pair of surfaces that face each other and a second pair of surfaces that face each other.

17. The wireless power transmitter of claim 13, wherein the at least one multiple polarization antenna comprises two single polarization antennas, and the two single polarization antennas form a predetermined angle therebetween.

18. A wireless power transmitter system comprising:
a wireless power transmitter; and
a wireless power receiver,
wherein the wireless power receiver comprises a beacon signal generator configured to generate beacon signals and an antenna configured to transmit the generated beacon signals upon receiving power signals from the wireless power transmitter, and the wireless power transmitter comprises a detector configured to detect a phase and an amplitude of the beacon signals, a modulator configured to modulate a phase of the power signals based on a time reversal phase of the beacon signals and to modulate an amplitude of the power signals based on a phase and amplitude control algorithm, a controller configured to calculate the time reversal phase of the beacon signals and to provide the phase and amplitude control algorithm to the modulator, and a plurality of antennas configured to receive the beacon signals and to transmit the modulated power signals to the wireless power receiver;

wherein the controller assigns a respective weight value for each of the power signals to the modulator based on the phase and amplitude control algorithm, wherein the amplitude of the power signals generated by the signal generator is amplified in a way that a greater the amplitude of the respective beacon signal received by a corresponding antenna of the plurality of antennas, a greater the weight value for amplifying the respective power signal transmitted by the corresponding antenna, and wherein the detector is further configured to perform feedback operation for detecting a phase and an amplitude of modified beacon signals over time, and detect respective rates of change as a function of time in the phase and the amplitude of the beacon signals, and the modulator is further configured to perform a time reversal process on the phase of the power signals and to amplify the amplitude of the power signals based on the modified beacon signals when at least one of the detected respective rates of change exceeds a predetermined value.

19. A wireless power transmitter comprising:

a signal generator configured to generate power signals;

a detector configured to detect a phase and an amplitude of beacon signals received from a wireless power receiver;

a modulator configured to modulate a phase and an amplitude of the power signals generated by the signal generator to be time reversed based on the received beacon signals and to be amplified, respectively;

a controller configured to provide a phase and amplitude control algorithm to be executed by the modulator; and a plurality of antennas configured to receive the beacon signals and to transmit the modulated power signals to the wireless power receiver, wherein the controller assigns a respective weight value for each of the power signals to the modulator based on the phase and amplitude control algorithm, wherein the amplitude of the power signals generated by the signal generator is amplified in a way that a greater the amplitude of the respective beacon signal received by a corresponding antenna of the plurality of antennas, a greater the weight value for amplifying the respective power signal transmitted by the corresponding antenna, and wherein the phase and amplitude control algorithm operates not to amplify at least one from among the power signals corresponding to a beacon signal having an amplitude that is less than or equal to a predetermined threshold value from among the beacon signals.

* * * * *